US011993692B2

(12) United States Patent
Antony et al.

(10) Patent No.: US 11,993,692 B2
(45) Date of Patent: May 28, 2024

(54) HIGH EFFICACY Cu-BASED ANTI-MICROBIAL FILMS AND SUBSTRATES AND METHODS OF MAKING THE SAME

(71) Applicant: CORNING INCORPORATED, Corning, NY (US)

(72) Inventors: Andrew Charles Antony, Ithaca, NY (US); Theresa Chang, Painted Post, NY (US); Sushmit Sunil Kumar Goyal, Painted Post, NY (US); Shrisudersan Jayaraman, Horseheads, NY (US); Rui Qi, New York, NY (US); Vinalia Tjong, Painted Post, NY (US); Shu Yuan, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/218,790

(22) Filed: Jul. 6, 2023

(65) Prior Publication Data
US 2023/0357541 A1 Nov. 9, 2023

Related U.S. Application Data

(63) Continuation of application No. PCT/US2022/026270, filed on Apr. 26, 2022.

(60) Provisional application No. 63/180,780, filed on Apr. 28, 2021.

(51) Int. Cl.
| | |
|---|---|
| C08K 13/02 | (2006.01) |
| A01N 25/08 | (2006.01) |
| A01N 59/20 | (2006.01) |
| C08J 5/18 | (2006.01) |
| C08K 3/40 | (2006.01) |
| C08K 5/00 | (2006.01) |
| C08K 5/315 | (2006.01) |
| C08K 5/521 | (2006.01) |
| C08K 5/524 | (2006.01) |
| C08K 5/5313 | (2006.01) |
| C08K 5/5333 | (2006.01) |
| C09D 5/14 | (2006.01) |
| C09D 7/20 | (2018.01) |
| C09D 7/48 | (2018.01) |
| C09D 7/61 | (2018.01) |
| C09D 7/63 | (2018.01) |
| C09D 125/06 | (2006.01) |
| C09D 133/12 | (2006.01) |
| C09D 179/08 | (2006.01) |

(52) U.S. Cl.
CPC ............. *C08K 13/02* (2013.01); *A01N 25/08* (2013.01); *A01N 59/20* (2013.01); *C08J 5/18* (2013.01); *C09D 5/14* (2013.01); *C09D 7/20* (2018.01); *C09D 7/48* (2018.01); *C09D 7/61* (2018.01); *C09D 7/63* (2018.01); *C09D 125/06* (2013.01); *C09D 133/12* (2013.01); *C09D 179/08* (2013.01); *C08J 2325/06* (2013.01); *C08J 2333/12* (2013.01); *C08J 2379/08* (2013.01); *C08K 3/40* (2013.01); *C08K 5/0091* (2013.01); *C08K 5/315* (2013.01); *C08K 5/521* (2013.01); *C08K 5/524* (2013.01); *C08K 5/5313* (2013.01); *C08K 5/5333* (2013.01)

(58) Field of Classification Search
CPC . C08J 5/18; C08K 5/521; C08K 5/524; C08K 5/5313; C08K 5/5333
See application file for complete search history.

(56) References Cited

U.S. PATENT DOCUMENTS

| | | | |
|---|---|---|---|
| 9,622,483 B2 | 4/2017 | Bookbinder et al. | |
| 10,034,478 B2 | 7/2018 | Krasnow et al. | |
| 2012/0301528 A1* | 11/2012 | Uhlmann | ............ A61Q 17/005 977/773 |
| 2015/0191607 A1 | 7/2015 | McDaniel | |
| 2015/0230476 A1* | 8/2015 | Bookbinder | ............ C03B 37/01 424/602 |

(Continued)

FOREIGN PATENT DOCUMENTS

| | | |
|---|---|---|
| CN | 101883663 A | 11/2010 |
| CN | 112335680 A | 2/2021 |

(Continued)

OTHER PUBLICATIONS

Abdelrahman et al; "Metal Complex Formation and Anticancer Activity of Cu(I) and Cu(II) Complexes With Metformin"; Molecules 2021, 26, 19 pages.

(Continued)

*Primary Examiner* — Robert T Butcher
(74) *Attorney, Agent, or Firm* — Travis B. Gasa (57) ABSTRACT

A method of forming an antimicrobial film, including providing a substrate with a polymer coating disposed thereon, the polymer coating including: an antimicrobial material, an inner surface contacting the substrate, and an outer surface opposite the inner surface; and extracting ions from the antimicrobial material toward the outer surface, such that the outer surface interacts with surface microorganisms. A composition, including a polymer; an antimicrobial material; and at least one of an organic solvent and an additive. The antimicrobial material comprises at least one of copper-containing glass particles, copper oxide particles, copper metal particles, copper salts, copper coordination complexes, cuprite crystals, and a combination thereof. Further, the additive can be selected to increase the oxidation resistance of the antimicrobial material.

29 Claims, 3 Drawing Sheets

(56) References Cited

U.S. PATENT DOCUMENTS

| | | | |
|---|---|---|---|
| 2017/0354143 A1 | 12/2017 | Rolfe et al. | |
| 2018/0310568 A1 | 11/2018 | Jiang et al. | |
| 2019/0029260 A1 | 1/2019 | Jiang et al. | |
| 2020/0216613 A1* | 7/2020 | White | C08K 5/34928 |
| 2021/0046506 A1* | 2/2021 | Mori | C08K 5/0025 |
| 2021/0277203 A1* | 9/2021 | Gopal | A41D 13/1192 |

FOREIGN PATENT DOCUMENTS

| | | |
|---|---|---|
| WO | 2005/051961 A1 | 6/2005 |
| WO | 2009/050251 A2 | 4/2009 |
| WO | 2012/162557 A1 | 11/2012 |
| WO | 2013/176702 A1 | 11/2013 |
| WO | 2015/076840 A1 | 5/2015 |
| WO | 2015/168430 A1 | 11/2015 |
| WO | 2017/132302 A1 | 8/2017 |
| WO | 2021/055300 A1 | 3/2021 |
| WO | 2022/084997 A1 | 4/2022 |
| WO | 2022/232089 A1 | 11/2022 |
| WO | 2023/034393 A1 | 3/2023 |

OTHER PUBLICATIONS

Alidori et al; "Synthesis, in Vitro and in Vivo Chanracterization of 64Cu(I) Complexes Derived From Hydrophilic Tris(Hydroxymethyl)Phosphane and 1,3,5-Triaza-7-Phosphaadamantane Ligands"; J. Biol. Inorg. Chem. (2008) 13, pp. 307-315.

Appleby et al; "Cu(I) Diimine Complexes as Immobilised Antibacterial Photosensitisers Operating in Water Under Visible Light"; Matter. Adv., 2020, 1, 11 pages.

Aronne et al; "Effect of Ligand Constraints Upon the Stabilities and Potentials of Macrocyclic Polythiaether Complexes. Copper(II) and Copper(I) Complexes With Cyclohexyl and Pheny Derivatives of [14]ANES4 in Water, 80 % Methanol, and Actonitrile"; Inorg. Chem, 1995, 34, pp. 357-369.

Burda et al; "Thoretical Model of Copper Cu(I)/Cu(II) Hydration. DFT and AB Initio Quantum Chemical Study"; Journal of Molecular Structure (Theochem) 683 (2004), pp. 183-193.

Castillo et al; "Water-Compatible Synthesis of 1,2,3-Triazoles Under Ultrasonic Conditions by a Cu(I) Complex-Mediated Click Reaction"; ACS Omega, 2020, 5, pp. 30148-30159.

Chen, X., et al., "Synthesis of novel copper sulfide hollow spheres generated from copper (II)-thiourea complex", Journal of Crystal Growth, vol. 263, No. 1-4, 2004, pp. 570-574.

Eastwood Safety Data Sheet; 2016, 6 Pages.

International Search Report and Written Opinion of the International Searching Authority; PCT/US2022/026270; dated Jun. 24, 2022; 11 pages; US Patent Office.

Kobayashi et al; "Effect of Water Coordination on Luminescent Properties of Pyrazine-Bridged Dinulcear Cu(I) Complexes"; Inorganic Chem, 2017, 56, pp. 4280-4288.

Kobayashi et al; "Effect of Water Coordination on Luminescent Properties of Pyrazine-Bridged Dinulcear Cu(I) Complexes"; Supporting Information; Dept. of Chem. Faculty of Science, Hokkaido Univ, 10 Pages.

Kobayashi et al; "Environmentally Friendly Mechanochemical Syntheses and Conversions of Highly Luminescent Cu(I) Dinuclear Complexes"; Inorg. Chem. 2016, 55, pp. 1978-1985.

Le Fur et al; "Improving the Stability and Inertness of Cu(II) and Cu(I) Complexes With Methylthiazolyl Ligands by Tuning the Macrocyclic Structure"; Dalton Trans., 2016, 45, 7406, 15 pages.

Le Fur et al; "Improving the Stability and Inertness of Cu(II) and Cu(I) Complexes With Methylthiazolyl Ligands by Tuning the Macrocyclic Structure"; Supplementary Information; Dalton Trans., 2016, 45, 28 pages.

Librando et al; "Synthesis of Novel Series of Cu(I) Complexes Bearing Alkylated 1,3,5-Triaza-7-Phosphaadamantane as Homogeneous and Carbon-Supported Catalysts for the Synthesis of 1- and 2-Substituted-1,2,3-Triazole"; Nanomaterials; 2021, 11, 29 pages.

Liu et al; "Alcohol Soluble Cu(I) Complexes With Aggregation-Induced Phosphorescent Emission in Ethanol/Water Solvents"; Polyhedron 164 (2019), pp. 152-158.

Manahan et al; "Complexes of Copper(I) and Silver (I) With Actonitrile in Water, the Lower Alcohols, Acetone, and Nitroethane"; J. Electroanal. Chem, 14, 1967, pp. 213-217.

Nekkanti et al; "Microwave-Assisted Direct Oxidative Synthesis of a-Ketoamides From Aryl Methyl Ketones and Amines by a Water Soluble Cu(I)-Complex"; Green Chem., 2016, 18, 19 pages.

Ohui et al; "New Water-Soluble Copper (II) Complexes With Morpholine-Thiosemicarbazone Hybrids: Insights Into the Anticancer and Antibacterial Mode of Action"; J. Med. Chem, 2019, 62, pp. 512-530.

Ozkal et al; "Covalently Immobilized Tris(Triazolyl)Methanol-Cu(I) Complexes: Highly Active and Recyclable Catalysts for CuAAC Reactions"; Catal. Sci. Technol., 2012, 2, pp. 195-200.

Pavelka et al; "Theoretical Description of Copper Cu(I)/Cu(II) Complexes in Mixed Ammine-Aqua Environement. DFT and AB Initio Quantum Chemical Study"; Chemical Physics, 312 (2005), pp. 193-204.

Pellei et al; "Syntheses and Biological Studies of Nitroimidazole Conjugated Heteroscorpionate Ligands and Related Cu(I) and Cu(II) Complexes"; Journal of Inorganic Biochemistry, 187 (2018), pp. 33-40.

Prochia et al; "Synthesis and Structural Chararchterization of Copper (I) Complexes Bearing N-Methyl-1,3,5-Triaza-7-Phosphaadamantane (mPTA) Cytotoxic Activity Evaluation of a Series of Water Soluble Cu(I) Derivatives Containing PTA, PTAH, and mPTA Ligands"; Journal of Inorganic Biochemistry 103 (2009), pp. 1644-1651.

Santini et al; "In Vitro Antitumour Activity of Water Soluble Cu(I), Ag(I), and Au(I) Complexes Supported by Hydrophilic Alkyl Phosphine Ligands"; Journal of Inorganic Biochemistry, 105 (2011), pp. 232-240.

Sponer et al; "Metal Ions in Noncomplementary DNA Base Pairs: An AB Initio Study of Cu(I), Ag(I), and Au(I) Complexes With the Cytosine-Adenine Base Pair"; JBIC 1999) 4:, pp. 537-545.

Tapanelli et al; "Novel Metalloantimalarials: Transmission Blocking Effects of Water Soluble Cu(I), Ag(I) Phosphane Complexes on the Murine Malaria Parasite Plasmodium Berghei"; Journal of Inorganic Biochemistry, 166 (2017), pp. 1-4.

Technical Data Sheet and Safety Data Sheets for the Wisebond® Bar & Table Top Epoxy Product; 2022, 14 Pages.

Tisato et al.; "The Relationship Between the Electrospray Ionization Behaviour and Biological Activity of Some Phosphino Cu(I) Complexes"; Rapid Commun. Mass Spectrom., 2010, 24; pp. 1610-1616.

Veljko Gavrilovic, et al., "Effects of copper citrate as a defoliant in nursery fruit stock production", Pestic. Phytomed., vol. 32, No. 3-4, 2017, pp. 231-236.

Wan et al; "Multicomponent Synthesis of 1,2,3-Triazoles in Water Catalyzed By Silica-Immobilized NHC-Cu(I)"; Catal Lett, (2012) 142: pp. 1134-1140.

Wang et al; "Reusable Ammonium Salt-Tagged NHC-Cu(I) Complexes: Preparation and Catalytic Application in the Three Component Click Reaction"; Green Chem., 2011, 13, 6 pages.

Wanke et al; "Cu(I) Complexes Bearing the New Sterically Demanding and Coordination Flexible Tris(3-Phenyl-1-Pyrazolyl)Methanesulfonate Ligand and the Water-Soluble Phosphine 1,3,5-Triaza-7-Phosphaadamantane or Related Ligands"; Inorg. Chem., 2008, 47, pp. 10158-10168.

Yang et al; "Promoting Effect of Water on Light and Phenanthroline-Diphosphine Cu(I) Complex Initiated Iodine Atom Transfer Cyclisation"; Chem. Commun. 2022, 58, 4 pages.

Zuo et al; "Cu(I) Complexes With Aggregation-Induced Emission for Enhanced Photodynamic Antibacterial Application"; Dalton Trans., 2023, 52, 6 pages.

* cited by examiner

HIGH EFFICACY Cu-BASED ANTI-MICROBIAL FILMS AND SUBSTRATES AND METHODS OF MAKING THE SAME

CROSS REFERENCE TO RELATED APPLICATIONS

This application is a continuation of International Application No. PCT/US2022/026270, filed on Apr. 26, 2022, which claims priority to U.S. Provisional Application No. 63/180,780, filed on Apr. 28, 2021, the content of each of which is relied upon and incorporated herein by reference in its entirety.

BACKGROUND

1. Field

This disclosure relates to antimicrobial films and methods for making such films.

2. Technical Background

Various objects can be exposed to undesired contaminants such as bacteria, viruses, mildew, mold, fungi, algae, and the like. Exposure to these contaminants can render the objects visually unattractive or unsuitable for a particular purpose, or even present a health hazard. Therefore, it can be desirable to mitigate the ability of the undesired contaminants to thrive once in contact with the surface of the object.

SUMMARY

Disclosed herein are antimicrobial films and methods for making such films.

In some embodiments, a method of forming an antimicrobial film comprises: providing a substrate with a polymer coating disposed thereon, the polymer coating including: an antimicrobial material, an inner surface contacting the substrate, and an outer surface opposite the inner surface; and extracting ions from the antimicrobial material toward the outer surface, wherein the outer surface is configured to interact with surface microorganisms.

In one aspect, which is combinable with any of the other aspects or embodiments, the antimicrobial material comprises at least one of: copper-containing glass particles, copper oxide particles, copper metal particles, copper salts, copper coordination complexes, cuprite crystals, and a combination thereof. In one aspect, which is combinable with any of the other aspects or embodiments, the antimicrobial material comprises copper-containing glass particles. In one aspect, which is combinable with any of the other aspects or embodiments, the glass particles include at least one of $SiO_2$, $Al_2O_3$, CaO, MgO, $P_2O_5$, $B_2O_3$, $K_2O$, ZnO, $Fe_2O_3$, nanoparticles thereof, and a mixture thereof. In one aspect, which is combinable with any of the other aspects or embodiments, the antimicrobial material comprises copper coordination complexes. In one aspect, which is combinable with any of the other aspects or embodiments, the ions comprise $Cu^{1+}$ ions.

In one aspect, which is combinable with any of the other aspects or embodiments, the polymer coating comprises at least one of poly(etherimide), polyamide imide, nylon, polyimide, aramids, melamine resin, urea-formaldehyde resins, polyacrylonitrile, copolyimide, imidazole, benzoxazole, benzimidazole, benzothiazole, benzopyrrole, pyrrole- and indole-containing polymers.

In one aspect, which is combinable with any of the other aspects or embodiments, the step of providing a substrate with a polymer coating disposed thereon comprises: combining the antimicrobial material with a polymer in an organic solvent, additive, or combination thereof, to form an antimicrobial matrix; and extruding, casting, or injection molding the antimicrobial matrix to form the polymer coating.

In one aspect, which is combinable with any of the other aspects or embodiments, the polymer comprises at least one of poly(etherimide), polyamide imide, nylon, polyimide, aramids, melamine resin, urea-formaldehyde resins, polyacrylonitrile, copolyimide, imidazole, benzoxazole, benzimidazole, benzothiazole, benzopyrrole, pyrrole- and indole-containing polymers.

In one aspect, which is combinable with any of the other aspects or embodiments, the organic solvent, additive, or combination thereof comprises at least one of N-methyl-2-pyrrolidone (NMP), dimethylformamide (DMF), acetamide, formamide, 2-pyrrolidone, N-formylmorpholine, cyclic amides, β-propiolactam, γ-butyrolactam, δ-valerolactam, ε-caprolactam, nitrile-containing molecules, acetonitrile, benzonitrile, phthalimides, melamine, urea, nitriles, imidazoles, benzoxazoles, benzimidazole, benzothiazole, benzopyrrole, pyrroles, indoles, maleimides, succinimides, organo-phosphates, organo-phosphites, organo-phosphonates, and substituted derivatives thereof.

In one aspect, which is combinable with any of the other aspects or embodiments, the additive comprises one or more of a phosphate, a crown ether, an organosulfur compound, a hydroxylamine, a urea, and a phosphine.

In one aspect, which is combinable with any of the other aspects or embodiments, the step of providing a substrate with a polymer coating disposed thereon comprises: combining the antimicrobial material with a polymer and additive to form an antimicrobial matrix; and extruding, casting, or injection molding the antimicrobial matrix to form the polymer coating, wherein the additive is selected to increase the oxidation resistance of the antimicrobial material, as exhibited after the step of extruding, casting, or injection molding.

In one aspect, which is combinable with any of the other aspects or embodiments, the additive comprises 2-ethylhexylphosphate and the polymer comprises poly(methyl methacrylate), and the antimicrobial film has an antimicrobial efficacy of at least 3 log kill after 14 days at 65° C. in 75% relative humidity. In one aspect, which is combinable with any of the other aspects or embodiments, the antimicrobial film has an antimicrobial efficacy of at least 3 log kill. In one aspect, which is combinable with any of the other aspects or embodiments, a thickness of the antimicrobial film is about 1 μm to about 100 μm. In one aspect, which is combinable with any of the other aspects or embodiments, a thickness of the antimicrobial film is within about 10% of a mean diameter of the antimicrobial material.

In some embodiments, a method of forming an antimicrobial film comprises: providing a substrate with a polymer coating disposed thereon, the polymer coating including: copper-containing glass particles, an inner surface contacting the substrate, and an outer surface opposite the inner surface; and extracting $Cu^{1+}$ ions from the copper-containing glass particles toward the outer surface, wherein the antimicrobial film has an antimicrobial efficacy of at least 3 log kill.

In one aspect, which is combinable with any of the other aspects or embodiments, the polymer coating comprises at least one of poly(etherimide), polyamide imide, nylon, polyimide, aramids, melamine resin, urea-formaldehyde resins, polyacrylonitrile, copolyimide, imidazole, benzoxazole, benzimidazole, benzothiazole, benzopyrrole, pyrrole- and indole-containing polymers.

In one aspect, which is combinable with any of the other aspects or embodiments, the step of providing a substrate with a polymer coating disposed thereon comprises: combining the copper-containing glass particles with a polymer in an organic solvent, additive, or combination thereof, to form an antimicrobial matrix; and extruding, casting, or injection molding the antimicrobial matrix to form the polymer coating.

In one aspect, which is combinable with any of the other aspects or embodiments, the polymer comprises at least one of poly(etherimide), polyamide imide, nylon, polyimide, aramids, melamine resin, urea-formaldehyde resins, polyacrylonitrile, copolyimide, imidazole, benzoxazole, benzimidazole, benzothiazole, benzopyrrole, pyrrole- and indole-containing polymers.

In one aspect, which is combinable with any of the other aspects or embodiments, the organic solvent, additive, or combination thereof comprises at least one of N-methyl-2-pyrrolidone (NMP), dimethylformamide (DMF), acetamide, formamide, 2-pyrrolidone, N-formylmorpholine, cyclic amides, β-propiolactam, γ-butyrolactam, δ-valerolactam, ε-caprolactam, nitrile-containing molecules, acetonitrile, benzonitrile, phthalimides, melamine, urea, nitriles, imidazoles, benzoxazoles, benzimidazole, benzothiazole, benzopyrrole, pyrroles, indoles, maleimides, succinimides, organo-phosphates, organo-phosphites, organo-phosphonates, and substituted derivatives thereof.

In one aspect, which is combinable with any of the other aspects or embodiments, the additive comprises one or more of a phosphate, a crown ether, an organosulfur compound, a hydroxylamine, a urea, and a phosphine.

In one aspect, which is combinable with any of the other aspects or embodiments, the step of providing a substrate with a polymer coating disposed thereon comprises: combining the copper-containing glass particles with a polymer and an additive to form an antimicrobial matrix; and extruding, casting, or injection molding the antimicrobial matrix to form the polymer coating, wherein the additive is selected to increase the oxidation resistance of the antimicrobial material, as exhibited after the step of extruding, casting, or injection molding.

In one aspect, which is combinable with any of the other aspects or embodiments, the additive comprises 2-ethylhexylphosphate and the polymer comprises poly(methyl methacrylate), and the antimicrobial film has an antimicrobial efficacy of at least 3 log kill after 14 days at 65° C. in 75% relative humidity.

In some embodiments, a composition comprises: a polymer; an antimicrobial material; and at least one of an organic solvent and an additive. Further, the antimicrobial material comprises at least one of copper-containing glass particles, copper oxide particles, copper metal particles, copper salts, copper coordination complexes, cuprite crystals, and a combination thereof.

In one aspect, which is combinable with any of the other aspects or embodiments, the antimicrobial material comprises copper-containing glass particles. In one aspect, which is combinable with any of the other aspects or embodiments, the glass particles include at least one of $SiO_2$, $Al_2O_3$, CaO, MgO, $P_2O_5$, $B_2O_3$, $K_2O$, ZnO, $Fe_2O_3$, nanoparticles thereof, and a mixture thereof. In one aspect, which is combinable with any of the other aspects or embodiments, the antimicrobial material comprises copper coordination complexes.

In one aspect, which is combinable with any of the other aspects or embodiments, the polymer comprises at least one of poly(etherimide), polyamide imide, nylon, polyimide, aramids, melamine resin, urea-formaldehyde resins, polyacrylonitrile, copolyimide, imidazole, benzoxazole, benzimidazole, benzothiazole, benzopyrrole, pyrrole- and indole-containing polymers.

In one aspect, which is combinable with any of the other aspects or embodiments, the organic solvent, additive, or combination thereof comprises at least one of N-methyl-2-pyrrolidone (NMP), dimethylformamide (DMF), acetamide, formamide, 2-pyrrolidone, N-formylmorpholine, cyclic amides, β-propiolactam, γ-butyrolactam, δ-valerolactam, ε-caprolactam, nitrile-containing molecules, acetonitrile, benzonitrile, phthalimides, melamine, urea, nitriles, imidazoles, benzoxazoles, benzimidazole, benzothiazole, benzopyrrole, pyrroles, indoles, maleimides, succinimides, organo-phosphates, organo-phosphites, organo-phosphonates, and substituted derivatives thereof, and the additive comprises 2-ethylhexylphosphate.

In one aspect, which is combinable with any of the other aspects or embodiments, an antimicrobial film derived from the composition has an antimicrobial efficacy of at least 3 log kill.

In one aspect, which is combinable with any of the other aspects or embodiments, the at least one of an organic solvent and an additive is an additive selected to increase the oxidation resistance of the antimicrobial material. In another aspect, which is combinable with any of the other aspects or embodiments, the additive comprises 2-ethylhexylphosphate and the polymer comprises poly(methylmethacrylate), and an antimicrobial film derived from the composition has an antimicrobial efficacy of at least 3 log kill after 14 days at 65° C. in 75% relative humidity.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

As used herein, the term "antimicrobial" means a material or surface that kills or inhibits the growth of microbes including bacteria, viruses, mildew, mold, algae, and/or fungi. The term antimicrobial does not mean the material or surface kills or inhibits the growth of all of such families of microbes or all species of microbes within such families, but that the material or surface kills or inhibits the growth of one or more species of microbes from one or more of such families.

As used herein, the term "log reduction" means the negative value of $\log(C_a/C_0)$, where $C_a$ is the colony form unit (CFU) number of the antimicrobial surface and $C_0$ is the CFU number of the control surface that is not an antimicrobial surface. The term "log kill" may be used interchangeably and equivalently with log reduction. As an example, a 3 log reduction equals about 99.9% of the microbes killed and a 5 log reduction equals about 99.999% of microbes killed. According to various examples, a log reduction of antimicrobial films described herein can be at least about 2, at least about 3, at least about 4, at least about 5, at least about 6, at least about 7, at least about 8, at least about 9, at least about 10, in a range of from about 1 to about 10, about 3 to about 7, about 4 to about 6, or less than, equal to, or greater than about 1, 2, 3, 4, 5, 6, 7, 8, 9, or about 10. Unless otherwise noted, the log reduction is measured according to the procedures outlined in the United States Environmental Protection Agency Office of Pesticide Programs Protocol for the Evaluation of Bactericidal Activity of Hard, Non-porous Copper Containing Surface Products, dated 29 Jan. 2016 (EPA Test). Further, in some aspects, these log kill levels can be exhibited by the antimicrobial films of the disclosure for an extended duration, e.g., after 7 days, or even 14 days, of exposure to accelerated aging conditions of 65° C. and 75% relative humidity (RH).

In operation, the antimicrobial film is configured to interact with and kill unwanted biological contaminants such as microbes in or on the surface of the composite film. For example, where the antimicrobial film is configured to have biocidal properties with respect to bacteria, suitable examples of bacteria include *Staphylococcus aureus, Enterobacter aerogenes, Pseudomonas aeruginosa*, Methicillin Resistant, *E. coli, Enterobacter cloacae, Acinetobacter baumannii, Enterococcus faecalis, Klebsiella pneumoniae, Klebsiella aerogenes, Staphylococcus aureus*, and mixtures thereof. Examples of viruses that the antimicrobial film can kill include Influenza H1N1, Adenovirus 5, and Norovirus. An example of a fungi the antimicrobial film can kill includes *Candida auris*.

Antimicrobial articles useful for certain applications should be durable enough for the purpose for which they are used, while also providing continuous antimicrobial properties that are passive or do not require additional activation by a user or outside source (e.g., UV light). In addition, antimicrobial articles should provide controlled antimicrobial activity. Further, antimicrobial articles should exhibit antimicrobial properties for a duration or lifetime commensurate with the demands of the applications in which they are used.

In some situations, conventional antimicrobial articles demonstrate far less antimicrobial efficacy. One problem associated with such articles is ensuring that the antimicrobial agents are present at the surfaces of these articles at a concentration sufficient to provide the desired antimicrobial efficacy. Another problem is that the exposed surface or surfaces of some conventional antimicrobial articles can require additional costly surface treatments and other processing steps to properly expose the antimicrobial agents in these articles to achieve required antimicrobial efficacy levels. Further, some of these treatments can degrade or otherwise alter mechanical and/or optical properties associated with the antimicrobial article.

The antimicrobial articles/films described herein possess exterior surfaces that can be configured to produce desired antimicrobial efficacy levels without detriment to other properties and/or with reduced cost, along with processes for making the same.

The antimicrobial films described herein can have improved performance compared to antimicrobial films in which an antimicrobial filler is dispersed homogenously throughout the film. For example, the asymmetric dispersion of the antimicrobial material such that the antimicrobial material is concentrated closer to the outer surface of the film can enable improved antimicrobial performance because a greater proportion of the antimicrobial material in the film can be available at the outer surface of the film for interacting with microbes present on the outer surface of the film. Additionally, or alternatively, the concentration of the antimicrobial material near the outer surface of the film can be increased without a corresponding increase in the bulk concentration of the antimicrobial material in the film, or the bulk concentration of the antimicrobial material in the film can be reduced without a corresponding reduction in the concentration of the antimicrobial material near the outer surface of the film. Such a reduced ratio of the bulk concentration of the antimicrobial material in the film to the concentration of the antimicrobial material near the outer surface of the film can enable the film to exhibit improved mechanical properties by avoiding the negative effects that can be associated with high loading of filler materials in polymers.

To achieve good antimicrobial efficacy, a relatively high loading of antimicrobial material can be used in a film. Antimicrobial material substantially distributed in the interior of the polymer matrix can exhibit limited antimicrobial efficacy compared to antimicrobial material more substantially distributed at the surface of the polymer material. Such limited antimicrobial efficacy can result from a lack of conducting channels from the interior of the film to the film surface. Accordingly, the antimicrobial films described herein can have an asymmetric distribution of the antimicrobial material preferentially toward the film surface. Such highly surface-oriented antimicrobial films can enable efficient and direct bacterial or viral contact for improved antimicrobial efficacy.

Antimicrobial efficacy degradation over time is also a concern for antimicrobial articles and films, particularly those employing a copper-based antimicrobial material. Inherently, $Cu^{1+}$ ions, which are strongly preferred for antimicrobial efficacy, are unstable in the presence of air and moisture in typical real-world situations and tend to oxidize to the less-preferred (i.e., in terms of antimicrobial efficacy) valence state, $Cu^{2+}$. As the copper-based antimicrobial material oxidizes over time, antimicrobial efficacy can be degraded to less than acceptable levels for the intended application. For example, moisture is more than likely to form on any antimicrobial surface in real-world situations and can tend to oxidize the copper ions in the antimicrobial films. Similarly, there is an inexhaustible source of oxidants in air and, therefore, the gaseous environment of the antimicrobial film can contribute to the oxidation of the copper-based antimicrobial material.

In aspects of the disclosure, a three-pronged approach can be employed to improve the longevity of the antimicrobial films and articles of the disclosure. A first prong of the approach is to improve the oxidation resistance of the copper-based antimicrobial material by selecting certain ligands or additives for inclusion in the film that provide oxidative stability to the copper. A second prong is to improve the migration and movement of the copper material to the surface of the antimicrobial film by the selection of copper oxidation-resistant additives and ligands that also possess shorter chains and/or are less reactive with the surrounding polymer matrix. A third prong is to ensure that copper-based antimicrobial material has a sufficient reservoir of copper to facilitate longer-term movement of the copper to the surface of the article or film, e.g., by selecting a polymer matrix material that interacts weakly with the copper-based antimicrobial material, thus favoring mobility of the copper-based antimicrobial material. All, or some, of the foregoing prongs can be employed in embodiments of the antimicrobial films and articles of the disclosure to improve the longevity of their antimicrobial efficacy levels.

In the present disclosure, a copper-containing antimicrobial agent is asymmetrically distributed at the article surface by extracting the antimicrobial agent from the interior of the article to the article surface. In instances where the article is polymer-based, current extraction techniques either require polymeric functional groups to interact with Cu ions or are inefficient due to limited polymer mobility. The result is a lack of, or short-lived, or inefficient (e.g., efficacy appears low for the given amount of available copper) antimicrobial efficacy. The present disclosure aims to solve at least the problem of low antimicrobial efficacy for articles containing antimicrobial agents in the interior of the article by extracting the antimicrobial agent to the article surface (asymmetrically distributed at the article surface). In some embodiments, extraction efficiency may be improved using a solvent, which improves mobility of the antimicrobial agent. In some embodiments, additives (or solvents) may be added that may extract Cu ions, even if the base polymer cannot extract Cu. Thus, as described herein, polymers/coatings are formulated to have antimicrobial character with judicious selection of solvent and/or additives.

Figure 1:
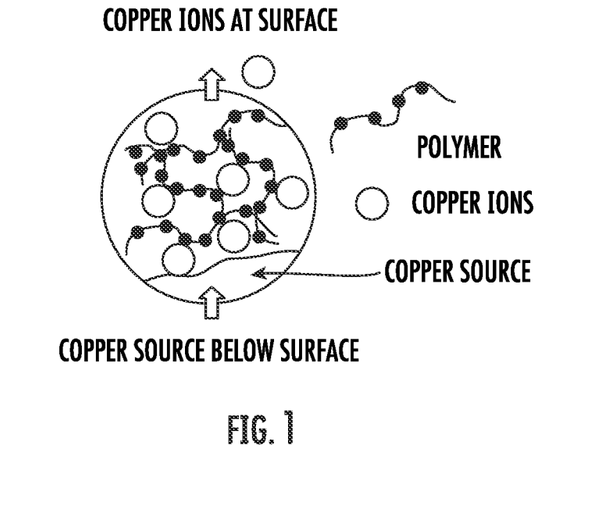
FIG. 1 is a schematic illustrating copper ion transport through a polymer matrix, according to some embodiments.

FIG. 1 is a schematic illustrating copper transport through a polymer matrix. For articles (e.g., substrates, coatings, polymers, combinations thereof (i.e., composites)) without protruding copper-containing particles to have antimicrobial character there requires a mechanism and driving force for copper ion transport from the copper reservoir source (e.g., copper-containing glass particles, copper oxide particles, copper metal particles, copper salts (e.g., copper halide, copper(I) acetate, copper sulfate, etc.), copper in coordination complex forms, cuprite crystals, or a combination thereof, any one of which may be dissolved or in solid form) to the article surface where it interacts with bacteria, viruses or other microbes, rendering them inactive. In some embodiments, Cu ions (and/or complexes) may already be dispersed within the coating/polymer/article (e.g., Cu-doped polymers). In some embodiments, both a copper reservoir source exists alongside Cu-doped polymers, to ensure replenishment of the Cu ion antimicrobial species and longevity of the antimicrobial activity of the article.

Examples of copper-containing glasses include, without limitation, those described in U.S. Pat. No. 9,622,483, ANTIMICROBIAL GLASS COMPOSITIONS, GLASSES AND POLYMERIC ARTICLES INCORPORATING THE SAME, and U.S. Patent Application Pub. No. 2019/0029260, ANTIMICROBIAL PHASE-SEPARABLE GLASS/POLYMER ARTICLES AND METHODS FOR MAKING THE SAME, each of which is assigned to Corning, Inc. and incorporated by reference herein in its entirety. In some embodiments, an inorganic glass portion of the copper-containing glass particles comprises one or more of $SiO_2$, $Al_2O_3$, $CaO$, $MgO$, $P_2O_5$, $B_2O_3$, $K_2O$, $ZnO$, $Fe_2O_3$, nanoparticles thereof, or a mixture thereof.

In some embodiments, the copper-containing glass particles comprise an inorganic glass comprising a copper component, or a Cu species. For example, the Cu species comprises $Cu^{1+}$, $Cu^0$, and/or $Cu^{2+}$. In some embodiments, the combined total concentration of the Cu species in the copper-containing glass is at least about 10 wt. %. However, the amount of $Cu^{2+}$ can be minimized or reduced, such that the copper-containing glass is substantially free of $Cu^{2+}$.

In some embodiments, $Cu^{1+}$ ions are present on or in the surface and/or the bulk of the copper-containing glass. For example, the $Cu^{1+}$ ions can be present in a glass network and/or a glass matrix of the copper-containing glass. $Cu^{1+}$ ions present in the glass network can be atomically bonded to the atoms in the glass network. $Cu^{1+}$ ions present in the glass matrix can be present in the form of $Cu^{1+}$ crystals dispersed in the glass matrix. For example, the $Cu^{1+}$ crystals comprise cuprite ($Cu_2O$). In embodiments comprising $Cu^{1+}$ ions, whether in a non-crystalline form, a crystalline form, or a combination thereof, the material may be referred to herein as a copper-containing glass. In embodiments comprising $Cu^{1+}$ ions in a crystalline form (e.g., cuprite crystals), the copper-containing glass may also be referred to as a copper-containing glass ceramic, which is intended to refer to a specific type of glass comprising crystals, and may be formed with or without a conventional ceramming process by which one or more crystalline phases are introduced and/or generated in the glass.

The transport mechanism to bring the active species, copper, in sufficient quantities, to the surface requires (1) extraction from the copper reservoir source into the article (e.g., polymer), (2) distribution of the copper (Cu) through the article, and (3) access to the article surface. Throughout the transport process, the Cu must be in a form such that when it reaches the surface, there remains antimicrobial functionality, given that the Cu may be modified by covalent or noncovalent interactions as it travels from the article bulk to the surface.

Detailed below is an improved means for extraction from the copper reservoir source into the article.

Copper Extraction and Mobility

Efficiency of copper extraction from the copper reservoir source impacts the amount of copper available to be distributed through the article body and to the surface. In cases where the article may be a polymer-based material, extraction efficiency relates to solvation of extracted copper ions, or more specifically, stability of the resulting copper-ligand complex. Aminated polymers (for example, polymers functionalized with amino groups), such as polyetherimide, or other amino-containing ethers and ketones, bond to copper much more strongly, resulting in a high extraction efficiency. In polymers such as nylon, polyetherimide (PEI), polyamide imide or other amide containing polymers, weak interactions between the polymer with the copper ions provide some stability to the copper ions as they are extracted and move into the polymer. For comparison, stronger interactions mean that the extracting entity (e.g., ligand) is better able to stabilize copper ions in the polymer than weaker interactions. A balance is needed between extraction of copper and copper mobility: too weak of an interaction leads to low extraction while too high of an interaction (strong bonding strength) results in low migration through the polymer. Conversely, polymers with no functional groups, such as poly(methyl methacrylate) (PMMA), polystyrene (PS), poly (vinyl chloride), or polyethylene, are also capable of stabilizing copper ions effectively; however, extraction efficiency is very limited.

Extraction efficiency relies upon the strength of interactions between Cu and extraction groups (e.g., functional groups), as well as the number of available extraction groups to extract Cu. Once extracted, compatibility will dictate distribution uniformity within the article and surface energy potentially favoring deposition to the article surface. In other words, high compatibility leads to more uniform distribution of Cu within the article and sufficient surface energy favoring movement of the Cu to the article surface.

Bonding strength of interacting species of the article (whether on the polymer matrix, or separately-included additive, or solvents) will also dictate mobility of the extracted copper ion. For example, interacting species with very strong bonds to copper may be efficient in copper ion extraction, but would also hinder Cu mobility through the article to be able to reach the article surface, as it would be difficult to break the bond. Antimicrobial efficacy requires sufficient Cu at the article surface. Mobility factors importantly for overall efficacy of the article over time, as the article ages. Bonding strength of interacting species of the article may also change the redox potential of the Cu ion, thereby potentially impacting the antimicrobial efficacy of the resulting Cu species. Positive or negative impacts on the antimicrobial efficacy additionally depend on stability, retention of oxidation state (i.e., retaining its $Cu^{1+}$ character versus converting to $Cu^{2+}$ or $Cu^0$), and other factors.

Detailed below is a three-pronged approach for improving the longevity of the antimicrobial efficacy of the copper-containing antimicrobial articles and films of the disclosure. As noted earlier, the approach involves one or more of the following prongs: (1) additive selection to minimize the redox potential of the complexes formed with the copper; (2) additive selection to improve the copper migration kinetics; and (3) polymer matrix selection and/or copper loading to promote movement of copper to the surface of the film over time.

As for the first prong, ligands and/or additives can be selected to minimize the extent of oxidation (i.e., redox potential) of the copper source (e.g., the monovalent copper ions in Corning® Guardiant® copper-containing glass particles). Such ligands and/or additives can be selected to retain antimicrobial efficacy of the copper source, while ensuring that the copper remains stable in its primary $Cu^{1+}$ state over time. In embodiments, the additive or ligand employed in the antimicrobial articles and films of the disclosure can be one more of a phosphate (e.g., 2-ethylhexyl phosphate (2-EHP), dibutyl phosphonic acid, dibutyl phosphate, diphenyl phosphate), a crown ether (e.g., a thia-crown ether), an organosulfur compound (e.g., thiourea, 3,6-dithia-1,8-octanediol, 2,2'-thiodiethanol), a hydroxylamine (e.g., O-ethylhydroxylamine hydrochloride), a urea, and a phosphine (e.g., diphenyl phosphine, triphenyl phosphine, tripropyl phosphine, trishydropropyl phosphine), along with any of the foregoing polymers of the disclosure that serve as a matrix. Further, implementations of these antimicrobial films and articles, tailored for longevity of antimicrobial efficacy, can employ any of the solvents of the disclosure during their preparation, formulation and deposition.

As for the second prong, the goal is to improve the migration and movement of the copper ions (e.g., the monovalent copper ions in the Corning® Guardiant® copper-containing glass particles) to the surface of the antimicrobial film by the selection of copper oxidation-resistant additives and ligands that also possess shorter chains and/or are less reactive with the surrounding polymer matrix. For ligands of similar surface energies and functional groups to the polymer matrix, various sterics can be selected to control migration of the copper ions within the polymer matrix. In particular, the ligand(s) can be selected with short side chains to improve the migration kinetics of the copper ions, as complexed with the ligand(s), through the polymer matrix to the surface of the antimicrobial film or article. In some embodiments, the ligand associated with copper ions (e.g., $Cu^{1+}$ or $Cu^{2+}$) can be selected such that it exhibits a diffusivity greater than $3.3 \times 10^{-7}$ cm$^2$/s and/or greater than 1.5 times that of the copper ions alone in the polymer matrix. In some embodiments, the ligand associated with copper ions (e.g., $Cu^{1+}$ or $Cu^{2+}$) can be selected such that it exhibits a diffusivity less than $2.5 \times 10^{-7}$ cm$^2$/s and/or less than 0.75 times that of the copper ions alone in the polymer matrix.

Further, in some implementations of the second prong, the ligand(s) can be selected such that they have a weak-to-moderate bonding potential with the polymer matrix material and/or a preference for migration (e.g., ligands that are perfluorinated or have fluoroether side chains). For example, a ligand with a weak hydrogen bonding potential could be employed for use with polymer matrix materials having hydrogen.

As for the third prong, the goal is to ensure that the copper-based antimicrobial material (e.g., Corning® Guardiant® copper-containing glass particles) has a sufficient reservoir of copper to facilitate longer-term movement of the copper to the surface of the article or film. In some implementations, a copper reservoir within the antimicrobial article or film can be achieved by selecting a polymer matrix material that interacts weakly with the copper-based antimicrobial material, thus favoring mobility of the copper-based antimicrobial material.

The antimicrobial efficacy of the composite films was evaluated using the EPA Test described earlier in this disclosure.

Example 1—Copper Extraction

Antimicrobial activity was determined for several Cu-doped polymers cast from different solvents having unique interactions with Cu ions, shown in Table 1 below.

TABLE 1

| Polymer | Solvent | | |
|---|---|---|---|
| | Chloroform ($CHCl_3$) | Acetone (($CH_3)_2CO$) | N-Methyl-2-pyrrolidone (NMP) |
| Polystyrene (PS) | − | − | + |
| Poly(methyl methacrylate) (PMMA) | − | − | + |
| Poly(etherimide) (PEI) | + | N/A | + |

Polymers were doped with varying amounts of copper-containing glass particles (e.g., Corning® Guardiant®) in a range of 5-20 wt. % and cast from chloroform, or acetone, or N-methyl-2-pyrrolidone (NMP) solvents.

In one example, polymers are first dissolved to form a 15 wt. % solution (e.g., Nylon in 1:1 acetone:trifluoroacetic acid; polyetherimide in NMP, etc.). The copper-containing Corning® Guardiant® glass particles are added to the solution as a powder (to make 5-20 wt. % relative to the polymer solids load), dispersed with a vortex mixer, and mixed with a magnetic stirrer for 2 hours. The solution was cast into a polytetrafluoroethylene (PTFE) dish and dried in an oven for about 16 hours at a temperature range of about 40-50 degrees below the solvent boiling point. The resultant free-standing film is cut into 1×1 sq.in. coupons for testing.

In some embodiments, the copper of the copper-containing glass particles can be present in any suitable amount. For example, a concentration of the copper can be in a range of about 5 wt. % to about 80 wt. % of the copper-containing glass particle, about 10 wt. % to about 70 wt. %, about 25 wt. % to about 35 wt. %, about 40 wt. % to about 60 wt. %, about 45 wt. % to about 55 wt. %, less than, equal to, or greater than about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, or about 80 wt. %. In a copper-containing glass particle, the copper portion can comprise one or more of Cu metal, $Cu^{1+}$, $Cu^{2+}$, or a combination of $Cu^{1+}$ and $Cu^{2+}$. The copper can be non-complexed or can have a ligand bonded thereto to form a complex.

From Table 1, '+' denotes a high antimicrobial efficacy of the Cu-doped polymer equivalent to bare copper metal, '−' denotes a low antimicrobial efficacy (i.e., less than 3 log kill), and 'N/A' denotes not applicable because the Cu-doped polymer is not soluble in the solvent. Interestingly and unexpectedly, polymers cast from NMP, where NMP has weak interactions with Cu, exhibit the best antimicrobial efficacy amongst all the solvents tested, even for those polymers having no functional groups (e.g., polystyrene and poly(methyl methacrylate)). Thus, the interactions between NMP and Cu for polystyrene and poly(methyl methacrylate) are sufficient to overcome the limited extraction efficiency of those polymers. When polystyrene and poly(methyl methacrylate) are cast with chloroform and acetone, a low antimicrobial efficacy is achieved. One explanation is that chloroform does not have free lone pair electrons and therefore, has too weak of an interaction with copper. Acetone does have lone pairs, but again, as with chloroform, has too weak of an interaction with copper. In general, ketones and aldehydes are not good at extracting copper. Compounds with nitrogen lone pairs are typically more efficient.

Alternatively, polyetherimide, a polymer with weak interactions with copper ions and which provides stability to the copper ions as they are extracted, whether cast from a Cu interacting solvent (NMP) or not (chloroform), has antimicrobial activity. Only polyetherimide (polymer) and NMP (solvent) both have interactions with Cu ions (lone pair electron). From an extraction perspective, interaction (i.e., coordination) may be defined as the degree of lone pair electron orbital overlap with d-orbitals of $Cu^{1+}$.

Figure 2:
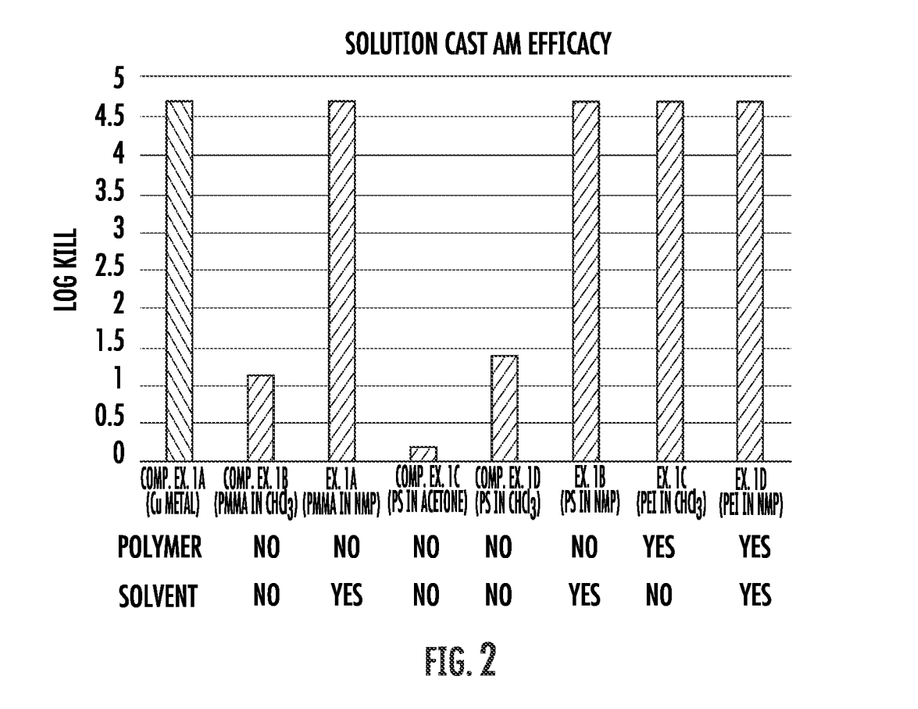
FIG. 2 is a plot illustrating log kill rate for bare copper metal and various Cu-doped polymers cast from different solvents, according to some embodiments.

Table 1 is numerically represented in FIG. 2, which illustrates log kill rate for bare copper metal (control, Comp. Ex. 1A) and various Cu-doped polymers cast from different solvents (i.e., Comp. Ex. 1B (PMMA in $CHCl_3$), Comp. Ex. 1C (PS in acetone) and Comp. Ex. 1D (PS in $CHCl_3$); and Ex. 1A (PMMA in NMP), Ex. 1B (PS in NMP), Ex. 1C (PEI in $CHCl_3$), and Ex. 1D (PEI in NMP)). To be able to achieve the minimum base level of antimicrobial efficacy (i.e., at least 3 log kill), FIG. 2 shows that at least one of either the polymer or solvent requires interactions with Cu to be able to extract Cu from the copper reservoir source, while still enabling uniform distribution of the Cu within the article and surface energy favoring deposition to the article surface. In fact, those polymer-solvent combinations where at least one has interactions with Cu are able to achieve antimicrobial efficacy comparable to the log kill of bare copper metal. The "yes" or "no" below each bar graph denotes whether the polymer or solvent has interactions (and can extract) copper ions. Those denoted "no" are also deemed as controls, i.e., Comp. Exs. 1B-1D.

Thus, as shown in Table 1 and FIG. 2, Cu-doped polymers may have antimicrobial efficacy when either (1) the polymer is able to extract Cu or (2) the solvent is able to extract Cu. Polymers able to extract copper include poly(etherimide), polyamide imide, nylon, polyimide, aramids, melamine resin, urea-formaldehyde resins, polyacrylonitrile, copolyimide, imidazole, benzoxazole, benzimidazole, benzothiazole, benzopyrrole, pyrrole- and indole-containing polymers. Solvents able to extract copper include NMP and other amide-containing solvents or additives.

Other solvents and/or additives with weak-to-moderate strength interactions with Cu ions (similar to NMP), include dimethylformamide (DMF), acetamide, formamide, 2-pyrrolidone, N-formylmorpholine (and other amide, urea, or alkylated derivatives, whether cyclic or otherwise), cyclic amides (e.g., lactams, such as β-propiolactam, γ-butyrolactam, δ-valerolactam, and ε-caprolactam (and other substituted derivatives)), nitrile-containing molecules (aliphatic or aromatic, including acetonitrile and benzonitrile), phthalimides, melamine, urea, imidazoles, benzoxazoles, benzimidazole, benzothiazole, benzopyrrole, pyrroles, indoles, maleimides, succinimides, organo-phosphates, organo-phosphites, organo-phosphonates, and substituted derivatives thereof.

Example 2—Copper Ion Mobility

As explained above, antimicrobial efficacy not only depends on extraction capability from the copper reservoir source into the article, but also the Cu ion's ability to move through the article body and have sufficient access to the article surface.

An aspect to this disclosure involves Cu ion mobility, specifically (1) using copper's ligand bonding capability to influence antimicrobial efficacy and redox stability of $Cu^{1+}$, (2) using side chains of the ligand to improve compatibility of the Cu-ligand complex in the polymer/coating, (3) optimizing mobility of the Cu-ligand complex in the polymer, and (4) altering surface energy of the Cu-ligand complex to favor migration to the article surface.

Figure 3:
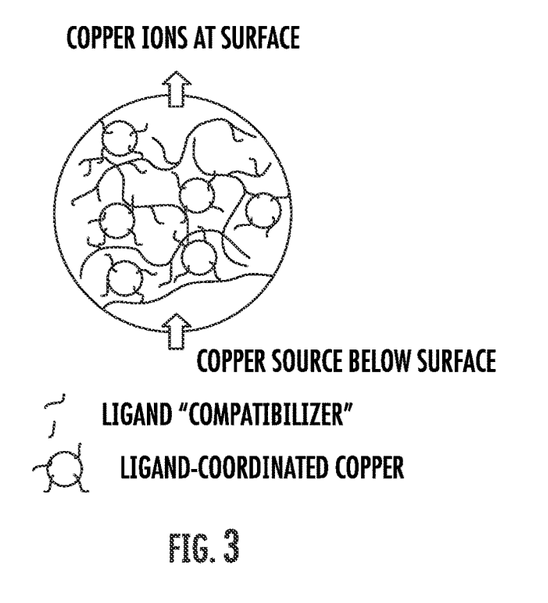
FIG. 3 is a schematic illustrating ligand-coordinated copper transport through a polymer matrix, according to some embodiments.

FIG. 3 is a schematic illustrating ligand-coordinated copper transport through a polymer matrix. Because copper may form 4-, 5-, and 6-coordinate complexes (depending on oxidation state and coordination geometry), selection of the number of ligands (e.g., those occupying one coordination side, bidentate ligands, tridentate ligands, combinations thereof) and functional groups of the ligands may influence the redox potential of the $Cu^{1+}$ ion to favor one oxidation state versus another. For example, nitrile of acetonitrile as a ligand will favor the preferred $Cu^{1+}$ state, thereby maintaining antimicrobial efficacy character. Selection of the ligand side chains can also affect compatibility of the Cu-ligand complex to favor extraction and mobility through the polymer/coating towards the surface.

Example 3—Method for Making an Antimicrobial Film

General methods of preparing an antimicrobial film may include mixing particles that include a phase-separable glass with a copper-containing antimicrobial agent with a matrix precursor that includes a polymer (e.g., polymeric particles) to define an antimicrobial matrix; and forming the antimicrobial matrix into an antimicrobial composite film that includes a matrix and a first plurality of particles within the matrix. In certain aspects, the method also can include a step of affixing the antimicrobial composite film to a primary surface of a bulk element (e.g., substrate). In some aspects, the antimicrobial article is the antimicrobial composite film. Other embodiments of the method further include a step of melting the matrix precursor of the antimicrobial matrix to provide a dispersion of the first plurality of particles, and the polymer is thermoplastic particles. In some embodiments, the forming step includes extruding, casting, or injection molding the antimicrobial matrix into the antimicrobial composite film, and the polymer is thermoplastic particles. In some embodiments, the dispersion may also comprise a thickener, a dispersant, other additive materials (e.g., a co-solvent, a pH modifier, a surfactant, a defoamer or air release agent, a rheological pigment, a stabilizer, a rheology modifier, etc.), or a combination thereof.

In some embodiments, the copper-containing antimicrobial agent comprises copper-containing glass particles, copper oxide particles, copper metal particles, copper salts (e.g., copper halide, copper(I) acetate, copper sulfate, etc.), copper in coordination complex forms (e.g., as a copper-containing organometallic), cuprite crystals, or a combination thereof, any one of which may be dissolved or in solid form.

In some embodiments, the antimicrobial film may have a thickness of about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, or any ranges defined by the listed values. Additionally, or alternatively, the thickness of the antimicrobial film can be based on the size of the particles of the antimicrobial agent. For example, the thickness of the antimicrobial film is within about 50%, within about 40%, within about 30%, within about 20%, or within about 10% of a median diameter of the particles of the antimicrobial agent.

In some embodiments, the median diameter is the D50 particle size of the particles of the antimicrobial agent, wherein the diameter of a particle is the largest dimension of the particle. Such a thickness of the antimicrobial film based on the size of the particles of antimicrobial agent can enable the antimicrobial material to be held in place within the antimicrobial film but also close enough to the outer surface to exhibit sufficient antimicrobial efficacy as described herein. Additionally, or alternatively, matching the thickness of antimicrobial film to the size of the particles of antimicrobial agent can enable a relatively high loading of the antimicrobial material near the surface of the antimicrobial film with a relatively low bulk loading of the antimicrobial material in the film as described herein.

In some embodiments, the antimicrobial material is asymmetrically dispersed in the antimicrobial film such that the antimicrobial material is concentrated closer to an outer surface of the antimicrobial film than to an inner surface of the antimicrobial film. As used herein, the outer surface comprises a side of the antimicrobial film interacting (e.g., contacting) with surface microorganisms, such as bacteria and viruses, and the inner surface is a side of the antimicrobial film (e.g., an air-facing or potential contact surface) affixed to the primary surface of the bulk element (e.g., substrate). The copper-containing antimicrobial agent can be distributed at or near the outer surface of the antimicrobial film, which enables efficient contact with surface microorganisms, while limiting the effect of the antimicrobial material on the brittleness of the antimicrobial film (e.g., by avoiding the brittleness that is typically associated with high filler ratio in a polymer).

Further methods of forming antimicrobial films are described in U.S. Patent Application Publication No. 2019/0029260, assigned to Corning, Inc. and incorporated by reference in its entirety.

Example 4—Additive to Minimize Copper Oxidation

Figure 4:
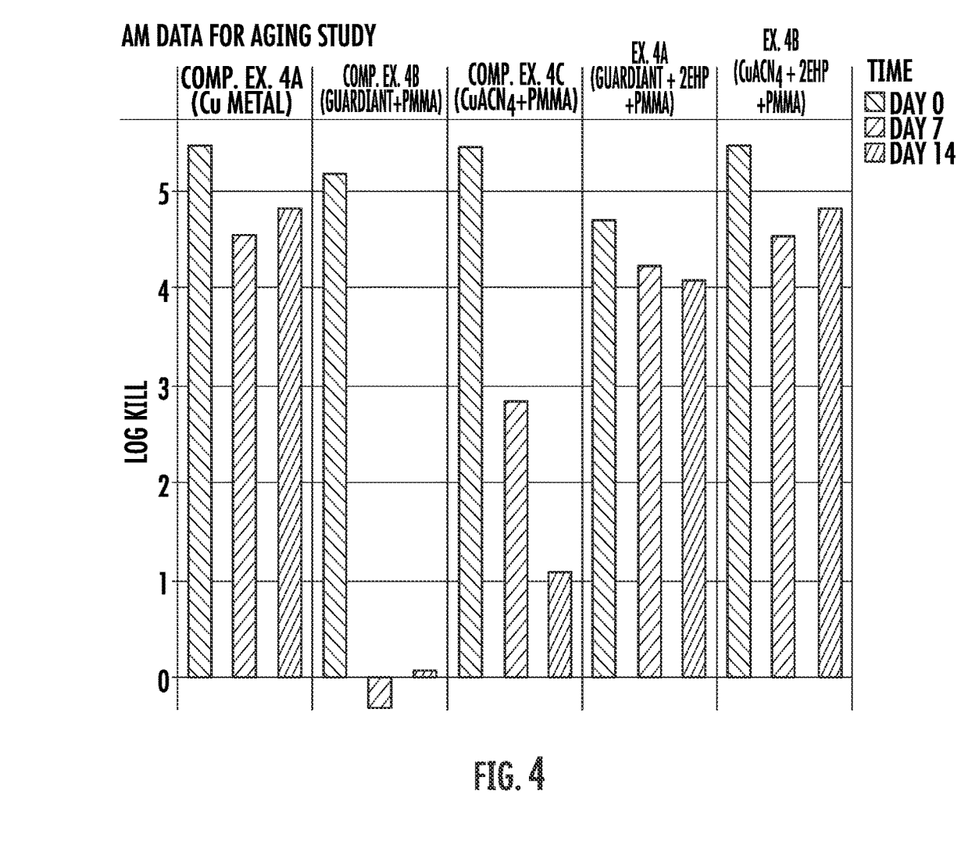
FIG. 4 is a plot illustrating log kill rate for bare copper metal and various Cu-doped polymers cast from a solvent and with or without an additive for inhibiting oxidation of the copper, according to some embodiments.

In this example, and as shown in FIG. 4, antimicrobial film samples are assessed for log kill rate as a function of exposure to an accelerated, atmospheric aging environment (65° C. and 75% RH) for 0 days, 7 days and 14 days. The samples in this example include a bare copper metal (Comp. Ex. 4A) and various Cu-doped polymers cast from a solvent with or without an additive for inhibiting oxidation of the copper. In particular, additional control examples include an antimicrobial film with Corning® Guardiant® copper-containing glass particles in PMMA (Comp. Ex. 4B) and a copper salt ($CuACN_4$) in PMMA (Comp. Ex. 4C). Further, inventive examples include an antimicrobial film with a 2EHP additive and Corning® Guardiant® copper-containing glass particles in PMMA (Ex. 4A) and a 2EHP additive and copper salt ($CuACN_4$) in PMMA (Ex. 4B).

With the exception of the bare copper control (Comp. Ex. 4A) and copper-containing glass particles in PMMA control (Comp. Ex. 4B), each of the samples was prepared according to the following protocol: 1. Dissolve 2.5 g PMMA in 12 g of chloroform (or NMP for Comp. Ex. 4B) by a stir bar and hot plate set at 60-70° C. for at least 4 hours; 2. Add 0.14 g Corning® Guardiant® or copper salt ($CuACN_4$) (for Exs. 4A and 4B, respectively) and 0.35 g 2-ethylhexylphosphate into the dissolved PMMA solution; 3. Mix with the vortex and follow by mixing on a stir bar for at least 2 hours; 4. Pour the mixture into a PTFE mold and leave the mold at ambient temperature under an exhaust for 12 hours; and 5. Remove the antimicrobial film from the mold and cut into 1"×1" for antimicrobial efficacy testing.

As is evident from FIG. 4, the bare copper control (Comp. Ex. 4A) exhibits at least a 3 log kill of antimicrobial efficacy for 0, 7 and 14 days of accelerated aging testing. However, the other control examples that lack an additive (Comp. Exs. 4B and 4C) demonstrate a significant loss in antimicrobial efficacy after 7 and 14 days of accelerated aging testing. Without being bound by theory, it is believed that these control examples experience a loss in AM efficacy as a function of accelerated aging test exposure duration from oxidation of the copper source from $Cu^{1+}$ to $Cu^{2+}$. Conversely, the inventive examples that include a 2EHP additive (i.e., Exs. 4A and 4B) do not experience a loss in AM efficacy and maintain at least a 3 log kill of antimicrobial efficacy for 0, 7 and 14 days of accelerated aging testing.

Example 5—Additives to Minimize Copper Oxidation

Figure 5:
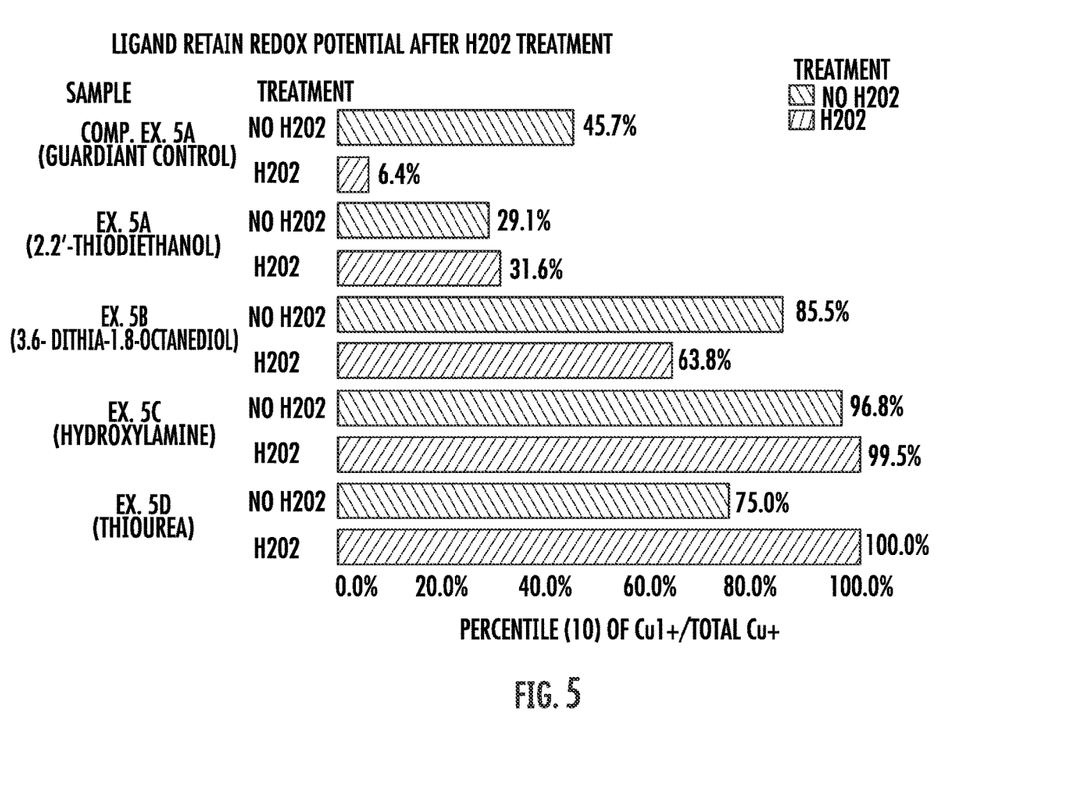
FIG. 5 is a plot illustrating the monovalent copper ion percentage remaining before and after an accelerated hydrogen peroxide environmental test conducted on various antimicrobial paints containing copper-glass particles, with and without additives to minimize the oxidation of monovalent copper ions, according to some embodiments.

In this example, and as shown in FIG. 5, antimicrobial paints are assessed for remaining monovalent copper ion percentage after an accelerated hydrogen peroxide environmental test. The samples in this example (Exs. 5A-5D) include various Cu-doped glass particles and Behr® paint in water with a ligand additive (Ex. 5A: 2,2'-thiodiethanol; Ex. 5B: 3,6-dithia-1,8-octanediol; Ex. 5C: hydroxylamine; and Ex. 5D: thiourea) for minimizing the oxidation of monovalent copper ions in the resulting polymer. Further, this example includes a control that comprises Cu-doped glass particles and Behr® paint in water without a ligand additive (Comp. Ex. 5A).

Each of the samples in this example was prepared according to the following protocol: 1. Disperse 0.252 g Corning® Guardiant® copper-containing glass particles in 1 ml of water and add to a mixture of 25 g of Behr® paint, and mix well; 2. Take 1 g of the mixed paint and measure the amount of monovalent copper ions ($Cu^{1+}$) and the total amount of copper ions with a stabilization test, and calculate a $Cu^{1+}$/total Cu+ percentage for the pre-hydrogen peroxide test condition; 3. Add 1 ml of 3% $H_2O_2$ to the paint from Step 1 and wait for 2 hours; and 4. Measure the amount of monovalent copper ions ($Cu^{1+}$) and the total amount of copper ions with a stabilization test, and calculate a $Cu^{1+}$/total Cu+ percentage for the post-hydrogen peroxide test condition.

As is evident from FIG. 5, the control group of paint samples with Corning® Guardiant® copper-containing glass particles and no additive (Comp. Ex. 5A) exhibits a drop from 46% to 6% monovalent copper ions before and after the accelerated hydrogen peroxide environmental test. In comparison, the inventive groups of paint samples with Corning® Guardiant® copper-containing glass particles and an additive (Ex. 5A: 2,2'-thiodiethanol; Ex. 5B: 3,6-dithia-1,8-octanediol; Ex. 5C: hydroxylamine; and Ex. 5D: thiourea) exhibit at least 32% monovalent copper ions after the hydrogen peroxide treatment, with less significant reductions from the test as compared to the control group (Comp. Ex. 5A).

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A composition, comprising:
    a polymer;
    an antimicrobial material comprising $Cu^{1+}$ ions; and
    an additive configured to increase the oxidation resistance of the $Cu^{1+}$ ions;
    wherein the antimicrobial material comprises copper salts, and the $Cu^{1+}$ ions and the additive form copper coordination complexes;
    wherein the additive comprises at least one of an organo-phosphate, an organ-phosphite, and a phosphine;
    wherein an antimicrobial film derived from the composition has an antimicrobial efficacy of at least 3 log kill as measured with EPA Test.

2. The composition of claim 1, wherein the additive comprises the organo-phosphate.

3. The composition of claim 2, wherein the organo-phosphate is at least one of 2-ethylhexyl phosphate, dibutyl phosphate, and diphenyl phosphate.

4. The composition of claim 1, wherein the additive comprises the phosphine.

5. The composition of claim 4, wherein the phosphine is at least one of diphenyl phosphine, triphenyl phosphine, tripropyl phosphine, and trishydropropyl phosphine.

6. The composition of claim 1, wherein the copper salts comprise a copper halide, a copper sulfate, copper(I) acetate, or any combination thereof.

7. The composition of claim 1, wherein the polymer comprises at least one of nylon, melamine resin, urea-formaldehyde resins, poly(methyl methacrylate), polystyrene, poly(vinyl chloride), and polyethylene.

8. The composition of claim 1, wherein the polymer comprises at least one of poly(etherimide), polyamide imide, polyimide, aramids, polyacrylonitrile, copolyimide, imidazole, benzoxazole, benzimidazole, benzothiazole, benzopyrrole, pyrrole-containing polymers, and indole-containing polymers.

9. The composition of claim 8, wherein an antimicrobial film derived from the composition exhibits the antimicrobial efficacy of at least 3 log kill after at least 14 days of exposure to accelerated aging conditions of 65° C. and 75% relative humidity.

10. The composition of claim 1, wherein the additive comprises 2-ethylhexylphosphate and the polymer comprises poly(methyl methacrylate), and further wherein an antimicrobial film derived from the composition has an antimicrobial efficacy of at least 3 log kill after 14 days at 65° C. in 75% relative humidity as measured with EPA Test.

11. The composition of claim 1, wherein an antimicrobial film derived from the composition has an antimicrobial efficacy of at least 3 log kill with respect to at least one of *Staphylococcus aureus*, *Enterobacter aerogenes*, *Pseudomonas aeruginosa*, Methicillin Resistant, *E. coli*, *Enterobacter cloacae*, *Acinetobacter baumannii*, *Enterococcus faecalis*, *Klebsiella pneumoniae*, *Klebsiella aerogenes*, Influenza H1N1, Adenovirus 5, Norovirus, and *Candida auris* as measured with EPA Test.

12. The composition of claim 1, wherein the composition is in a form of a paint or coating.

13. The composition of claim 1, wherein the composition is in a form of an article.

14. A composition, comprising:
    a polymer;
    an antimicrobial material comprising $Cu^{1+}$ ions; and
    an additive configured to increase the oxidation resistance of the $Cu^{1+}$ ions;
    wherein the antimicrobial material comprises copper salts, and the $Cu^{1+}$ ions and the additive form copper coordination complexes;
    wherein the additive comprises an organo-phosphite; and
    wherein an antimicrobial film derived from the composition has an antimicrobial efficacy of at least 3 log kill as measured with EPA Test.

15. The composition of claim 14, wherein the polymer comprises at least one of nylon, melamine resin, urea-formaldehyde resins, poly(methyl methacrylate), polystyrene, poly(vinyl chloride), and polyethylene.

16. The composition of claim 14, wherein the antimicrobial material comprises the copper salts, and the copper salts comprise a copper halide, a copper sulfate, copper(I) acetate, or any combination thereof.

17. The composition of claim 14, wherein the polymer comprises poly(vinyl chloride).

18. The composition of claim 14, wherein an antimicrobial film derived from the composition exhibits the antimicrobial efficacy of at least 3 log kill after at least 14 days of exposure to accelerated aging conditions of 65° C. and 75% relative humidity.

19. The composition of claim 14, wherein an antimicrobial film derived from the composition has an antimicrobial efficacy of at least 3 log kill with respect to at least one of *Staphylococcus aureus, Enterobacter aerogenes, Pseudomonas aeruginosa, Methicillin Resistant, E. coli, Enterobacter cloacae, Acinetobacter baumannii, Enterococcus faecalis, Klebsiella pneumoniae, Klebsiella aerogenes*, Influenza H1N1, Adenovirus 5, Norovirus, and *Candida auris* as measured with EPA Test.

20. The composition of claim 14, wherein the composition is in a form of a paint.

21. The composition of claim 14, wherein the composition is in a form of a coating.

22. The composition of claim 14, wherein the composition is in a form of an article.

23. The composition of claim 1, wherein the composition is in the form of a paint.

24. The composition of claim 1, wherein the polymer comprises poly(vinyl chloride).

25. The composition of claim 24, wherein the copper salts comprise a copper halide, a copper sulfate, copper(I) acetate, or any combination thereof.

26. The composition of claim 24, wherein an antimicrobial article or coating derived from the composition exhibits the antimicrobial efficacy of at least 3 log kill after at least 14 days of exposure to accelerated aging conditions of 65° C. and 75% relative humidity.

27. The composition of claim 24, wherein an antimicrobial article or coating derived from the composition has an antimicrobial efficacy of at least 3 log kill with respect to at least one of *Staphylococcus aureus, Enterobacter aerogenes, Pseudomonas aeruginosa, Methicillin Resistant, E. coli, Enterobacter cloacae, Acinetobacter baumannii, Enterococcus faecalis, Klebsiella pneumoniae, Klebsiella aerogenes*, Influenza H1N1, Adenovirus 5, Norovirus, and *Candida auris* as measured with EPA Test.

28. The composition of claim 24, wherein the composition is in a form of a coating.

29. The composition of claim 24, wherein the composition is in a form of an article.

* * * * *

UNITED STATES PATENT AND TRADEMARK OFFICE
CERTIFICATE OF CORRECTION

| | |
|---|---|
| PATENT NO. | : 11,993,692 B2 |
| APPLICATION NO. | : 18/218790 |
| DATED | : May 28, 2024 |
| INVENTOR(S) | : Antony et al. |

It is certified that error appears in the above-identified patent and that said Letters Patent is hereby corrected as shown below:

In the Claims

In Column 16, Line 2, in Claim 1, delete "organ-phosphite" and insert -- organo-phosphite --

Signed and Sealed this
Eighth Day of October, 2024

Katherine Kelly Vidal
*Director of the United States Patent and Trademark Office*